United States Patent
Nagasaka et al.

(10) Patent No.: US 11,968,164 B2
(45) Date of Patent: Apr. 23, 2024

(54) DEVICE AND METHOD FOR ASSISTING SNS CONSULTATION, AND PROGRAM THEREFOR

(71) Applicant: A'S CHILD INC., Tokyo (JP)

(72) Inventors: Takeki Nagasaka, Toyota (JP); Masashi Nishitani, Taito-ku (JP)

(73) Assignee: A'S CHILD INC., Tokyo (JP)

( * ) Notice: Subject to any disclaimer, the term of this patent is extended or adjusted under 35 U.S.C. 154(b) by 0 days.

(21) Appl. No.: 17/277,521

(22) PCT Filed: Sep. 17, 2019

(86) PCT No.: PCT/JP2019/036434
§ 371 (c)(1),
(2) Date: Mar. 18, 2021

(87) PCT Pub. No.: WO2020/059724
PCT Pub. Date: Mar. 26, 2020

(65) Prior Publication Data
US 2022/0038413 A1    Feb. 3, 2022

(30) Foreign Application Priority Data
Sep. 18, 2018   (JP) ................................. 2018-173445

(51) Int. Cl.
*H04L 12/58* (2006.01)
*G06Q 10/10* (2023.01)
(Continued)

(52) U.S. Cl.
CPC ........... *H04L 51/52* (2022.05); *G06Q 10/107* (2013.01); *G06Q 50/26* (2013.01)

(58) Field of Classification Search
None
See application file for complete search history.

(56) References Cited

U.S. PATENT DOCUMENTS

| 9,325,849 B1 * | 4/2016 | Brydon | ............... H04M 3/5233 |
| 9,654,640 B1 * | 5/2017 | Brydon | ................. G06Q 10/10 |

(Continued)

FOREIGN PATENT DOCUMENTS

| JP | 2003-22326 | | 1/2003 | |
| KR | 102187686 B1 | * | 12/2020 | |
| WO | WO-2014169268 A1 | * | 10/2014 | ......... G06Q 30/0202 |

OTHER PUBLICATIONS

Releasing of multi-platform SNS consultation system, Connected Consultation, Dec. 6, 2019.
(Continued)

*Primary Examiner* — Natisha D Cox
(74) *Attorney, Agent, or Firm* — Cozen O'Connor (57) ABSTRACT

In this method for assisting an SNS consultation, consultants are efficiently allocated to clients. An assisting server 100 detects a new consultation to be performed on communication with a client terminal 120 has occurred or may occur (S301). Next, the server 100 transmits a pre-consultation question to the client terminal 120 (S302) which may be a plurality of hierarchical questions by which a category that characterizes the consultation contents can be assigned. On the basis of the answer(s) to the pre-consultation questions (S303), the server 100 determines a category corresponding to the answers and assigns the category to the consultation contents (S304). If categories that each consultant can handle are stored in a storage unit 103, or a storage medium or device which can be accessed from the apparatus 100, by providing a category to a consultation content, the consultation contents can be allocated to a consultant for response.

19 Claims, 4 Drawing Sheets

(51) Int. Cl.
*G06Q 10/107* (2023.01)
*G06Q 50/26* (2012.01)
*H04L 51/52* (2022.01)

(56) References Cited

U.S. PATENT DOCUMENTS

| | | | |
|---|---|---|---|
| 10,944,800 B1 * | 3/2021 | Arsanjani | H04L 67/60 |
| 2011/0103567 A1 * | 5/2011 | Kashi | H04M 7/0024 |
| | | | 379/202.01 |
| 2014/0324757 A1 * | 10/2014 | Tabrizi | G06F 16/00 |
| | | | 706/50 |
| 2017/0039502 A1 * | 2/2017 | Guman | G06Q 10/06393 |
| 2017/0061411 A1 * | 3/2017 | Sherman | G06Q 50/184 |

OTHER PUBLICATIONS

Written Opinion issued in corresponding PCT Application No. PCT/JP2019/036434.

* cited by examiner

SUICIDE

| RESPONDENT | CONTENTS | SCORE | KEY WORD | USER NAME | ELAPSED TIME | START DATE | NOS. OF CONSULTATION |
|---|---|---|---|---|---|---|---|
| SELECT | SHOW | 40 | SHINTAI, TSURU, NYUSUI, HOTYO | AA | 2 HOURS 35 MINUTES | 2018/05/01 19:25 | 1 |
| | SHOW | 21 | JISATSU, RENTAN | BB | 3 HOURS 35 MINUTES | 2018/05/01 18:25 | 2 |

MOMOKO YAMAMOTO (0 cases responding)
TARO TANAKA (1 case responding)
TSUNAO YAMADA (3 cases responding)

BULLYING

| RESPONDENT | CONTENTS | SCORE | KEY WORD | USER NAME | ELAPSED TIME | START DATE | NOS. OF CONSULTATION |
|---|---|---|---|---|---|---|---|
| SELECT | SHOW | 36 | BOKORARE, PASHIRI, IJIME, NAGURARE | CC | 2 HOURS 35 MINUTES | 2018/05/01 19:25 | 1 |
| SELECT | SHOW | 21 | NAGURARE, KUSAI | DD | 3 HOURS 35 MINUTES | 2018/05/01 18:25 | 2 |
| SELECT | SHOW | 11 | KATAPAN | EE | 10 MINUTES | 2018/05/01 22:40 | 5 |

PERSONAL DISTRESS AND ABUSE

| RESPONDENT | CONTENTS | SCORE | KEY WORD | USER NAME | ELAPSED TIME | START DATE | NOS. OF CONSULTATION |
|---|---|---|---|---|---|---|---|
| SELECT | SHOW | 28 | DV, TASUKETE | FF | 2 HOURS 35 MINUTES | 2018/05/01 19:25 | 2 |
| SELECT | SHOW | 13 | GYAKUTAI, TSURAI | GG | 3 HOURS 35 MINUTES | 2018/05/01 18:25 | 1 |
| SELECT | SHOW | 11 | NIKIBI, WARUGUCHI | HH | 10 MINUTES | 2018/05/01 22:40 | 1 |

DEVICE AND METHOD FOR ASSISTING SNS CONSULTATION, AND PROGRAM THEREFOR

RELATED APPLICATIONS

This is a U.S. National Phase Application under 35 USC 371 of International Application PCT/JP2019/036434 filed on Sep. 17, 2019.

This application claims the priority of Japanese application no. 2018-173445 filed Sep. 18, 2018, the entire content of which is hereby incorporated by reference.

FIELD OF THE INVENTION

The present invention relates to an apparatus, method, and program for supporting SNS consultation.

BACKGROUND OF THE INVENTION

With the rapid penetration of SNS among young people, especially junior high and high school students, consultation over problems for young people that various organizations have been providing over the phone have become outdated. Communication among young people has shifted from telephone to SNS, and the threshold for the act of asking for an advice over the phone is high.

In this context, some organizations are trying out consultation over problems using SNS (hereinafter referred to as "SNS consultation"). For example, in 2017, Nagano Prefecture offered consultation over problems via LINE (registered trademark) (see Non-Patent Document 1). In March 2018, as part of the Ministry of Health, Labor and Welfare's effort "Suicide Prevention Reinforcement Month," the ministry offered consultation over suicide using SNS consultation to a wide range of young people in general, and approximately 10,000 consultations were conducted in one month (see Non-Patent Document 2).

PRIOR ART

Non-Patent Documents

Non-Patent Document 1: "About the results of bullying and suicide consultation using LINE", [online], May, 2008, Nagano Prefectural Board of Education, [retrieved Sep. 14, 2008], the Internet <https://www.pref.nagano.lg.jp/kyoiku/kyoiku/shido/sodan/do cuments/shikoukekkano-gaiyou.pdf>.

Non-Patent Document 2: "We publish the results of the implementation of the SNS consultation project during the Suicide Prevention Enhancement Month (March)", [online], Apr. 27, 2008, Ministry of Health, Labor and Welfare, [retrieved Sep. 14, 2008], the Internet <https://www.mhlw.go.jp/stf/houdou/0000204757.html>.

SUMMARY OF INVENTION

However, as SNS lowers the barrier and more consultations are received, it is not easy to set up a consultation system that can respond to all consultations immediately. If a message such as "We are currently busy, please wait a while before contacting us." is automatically sent when busy or if it is not possible to reply to a message from a client even though the message is marked as read, there is a risk that it may discourage young people who had the courage to make a consultation, and cause them not to ever think of making a consultation.

SUMMARY OF THE INVENTION

The objective of the present invention is to efficiently assign a consultant to a client during congestion, and more generally, to efficiently assign a consultant to a client, in an apparatus, method, and program for supporting SNS consultation.

In order to achieve these objectives, the first aspect of the present invention is a method for supporting SNS consultation, comprising: detecting that a new consultation has occurred or may occur based on communication with a client terminal, transmitting a pre-consultation question to the client terminal after the detection, and receiving an answer to the pre-consultation question from the client terminal.

The second method of the invention is the method according to the first aspect, wherein the pre-consultation question is a plurality of hierarchical questions.

The third aspect of the present invention is the method according to the first or second aspect, further comprising providing a category corresponding to one or more answers to the pre-consultation question to consultation contents of the consultation.

The fourth aspect of the invention is the method according to the third aspect, further comprising allocating a consultant, who can respond to consultations with the category provided to the consultation contents, to a client of the client terminal.

The fifth aspect of the present invention is the method according to the third or fourth aspect, wherein an order of priority is set to a plurality of categories that can be provide to consultation contents.

The sixth aspect of the invention is the method according to the third aspect, further comprising scoring the consultation contents when there are no consultants who can be allocated to the client of the client terminal.

The seventh aspect of the invention is the method according to the sixth aspect, wherein the scoring is performed based on contents input by the client with respect to the consultation contents.

The eighth aspect of the present invention is the method according to the seventh aspect, wherein the scoring is performed by calculating a sum of scores pre-set to one or more keywords included in the contents input by the client with respect to the consultation contents, or a value corresponding to the sum.

The ninth aspect of the present invention is the method according to any one of the sixth to eighth aspects, further comprising transmitting a message prompting an input with respect to the consultation contents to the client terminal after provision of the category.

The tenth aspect of the invention is the method according to any one of the sixth to tenth aspects, wherein the scoring includes updating a score when the client made an additional input.

The eleventh aspect of the present invention is the method according to any one of the sixth to the tenth aspects, further comprising allocating a consultant to a client of the client terminal, if a score of the consultation contents is higher than scores of other consultation contents to which the category is provided when a consultant who can address a consultation with the category provided to the consultation contents becomes available.

The twelfth aspect of the present invention is the method according to any one of the sixth to the eleventh aspects, further including transmitting an emergency notification to a manager terminal or a consultant terminal a score of the consultation contents reaches or exceeds a predetermined threshold.

The thirteenth aspect of the present invention is the method according to any one of the first to twelfth aspects, further comprising transmitting contents for a client to deepen understanding on own consultation contents to the client terminal before transmitting the pre-consultation question.

The fourteenth aspect of the present invention is a program for causing a computer to execute a method for supporting SNS consultation, the method comprising: detecting that a new consultation has occurred or may occur based on communication with a client terminal, transmitting a pre-consultation question to the client terminal after the detection, and receiving an answer to the pre-consultation question from the client terminal.

The fifteenth aspect of the present invention is an apparatus for supporting SNS consultation, configured to: detect that a new consultation has occurred or may occur based on communication with a client terminal, transmit a pre-consultation question to the client terminal after the detection, and receive an answer to the pre-consultation question from the client terminal.

According to an aspect of the present invention, by transmitting a pre-consultation question to a client terminal, it is possible to elicit responses from the client regarding consultation contents, thereby streamlining the allocation of a consultant.

DETAILED DESCRIPTION OF THE DRAWINGS

Embodiments of the present invention is explained in detail with reference to the drawings.

First Embodiment

Figure 1:
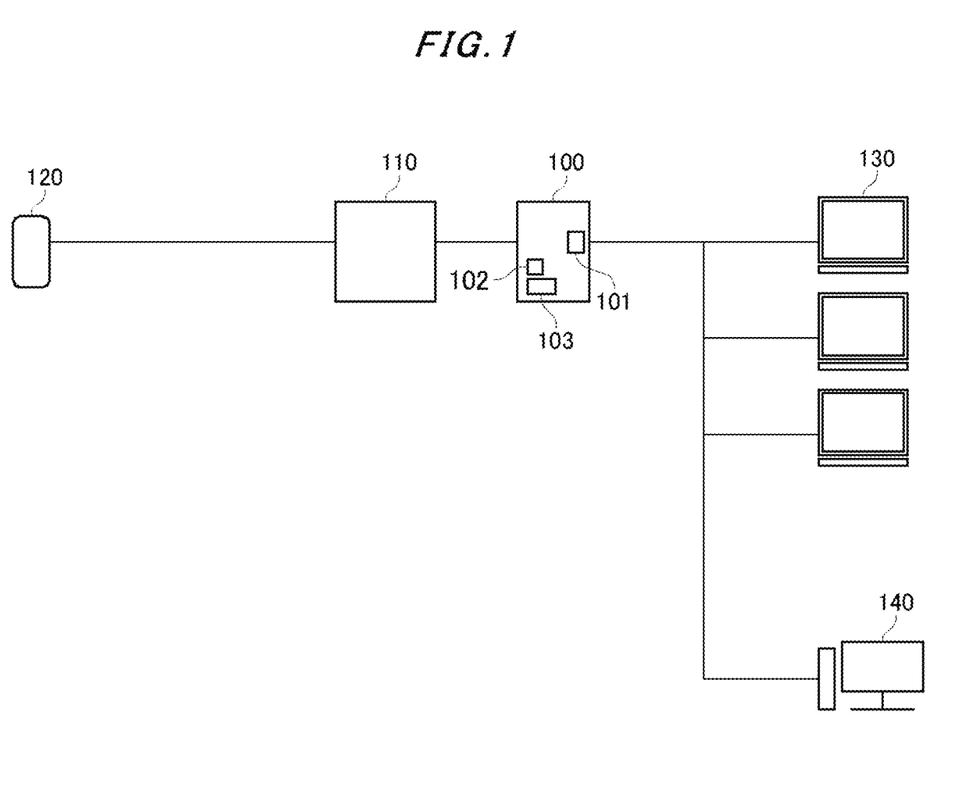
FIG. 1 shows the SNS consultation supporting apparatus according to the first embodiment of the present invention.

FIG. 1 shows an SNS consultation supporting apparatus according to the first embodiment of the present invention. The apparatus 100 communicates with the client terminal 120 of a client through the SNS server 110 for providing an SNS service, and also with the consultant terminal 130 of a consultant and, if necessary, the administrator terminal 140 for an administrator of a consultation desk. The number of each type of terminals is for illustrative purpose only.

The SNS (Social Network Service) provided by the SNS server 110 allows users to send and receive messages from each other, and the SNS server 110 can send a message sent by one user to the other user, and send a reply message from the other user to the user.

In this embodiment, as users, there are an account for the consultation desk and an account for each client, and a client sends a message addressed to the consultation desk and receives a reply from the consultation desk. The message addressed to the consultation desk is received by the apparatus 100 from the SNS server 110, for example, using an API, and the apparatus 100 displays the message or makes the message displayable at the consultant terminal 130. The message sent from the consultant terminal 130 of the consultant who converses with the client is passed by the apparatus 100 to the SNS server 110, for example, using an API, and is sent from the SNS server 110 to the client terminal 120. The administrator terminal 140 can also display messages addressed to the consultation counter, and the consultant terminal 130 and the administrator terminal 140 can communicate directly or indirectly through the apparatus 100.

In the following, we will describe an example where the supporting server 100 exists separately from the SNS server 110. In some cases, the supporting server 100 itself provides the SNS service, and in this case, the data transmission and reception between the supporting server 100 and the SNS server 110 described below will be data acquisition or reading on the same server.

The supporting server or apparatus 100 comprises a communication unit 101 such as a communication interface, a processing unit 102 such as a processor, a CPU, etc., and a storage unit 103 including a storage apparatus or a storage medium such as a memory, a hard disk, etc., and can be configured by executing a program for performing each process. The apparatus 100 may include one or more apparatuses, computers or servers. The program may include one or more programs, and may be stored on a computer-readable storage medium to form a non-transitory program product.

Figure 2:
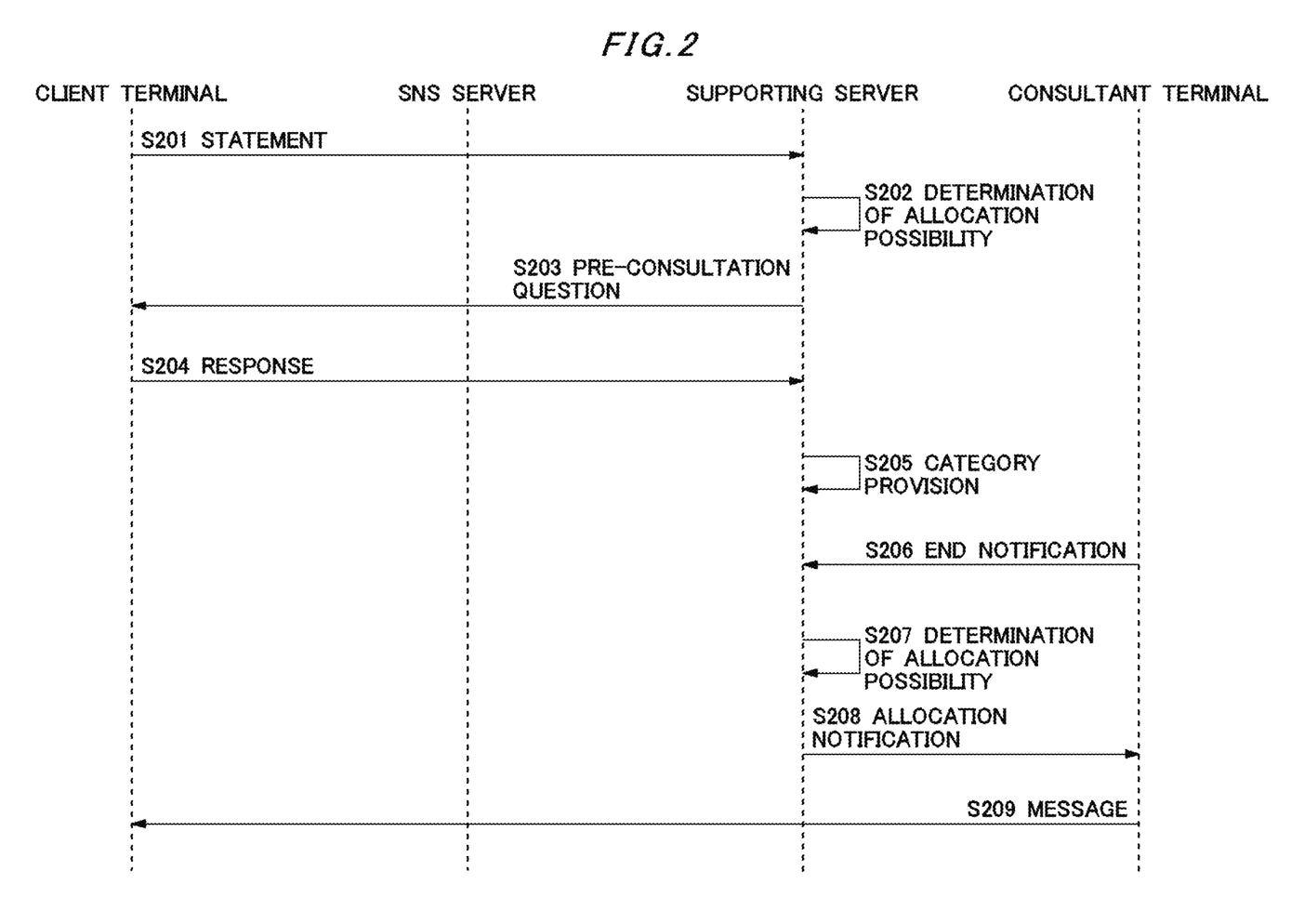
FIG. 2 shows the SNS consultation supporting method according to the first embodiment of the present invention.

First, a statement by the client is transmitted from the client terminal 120 to the supporting server 100 via the SNS server 110 (S201). The examples of the statement are "Can I talk to you?" "I am being bullied." and so on. The supporting server 100, which receives the statement from the client terminal 120, can refer to the availability status of the consultants and determine whether a consultant can be allocated (S202). The determination of allocation possibility is made in response to the receipt of the statement from the client terminal 120, but it may also be made in response to the detection that a new consultation based on communication with the client terminal 120 has occurred or may occur, such as the fact that the consultation desk account has been registered as a friend on the client terminal 120.

The supporting server 100 can store the availability status of each consultant and refer to it when a new consultation from a new client occurs to allocate a consultant to the client. The availability status may be stored not in the storage unit 103 of the supporting server 100, but in a storage medium or storage apparatus accessible from the supporting server 100. When a consultant can be allocated, the supporting server 100 transmits an allocation notification (not shown) to the consultant terminal 130 of the consultant, and the consultant starts a conversation with the client. Instead of the supporting server 100 automatically performing the allocation, if the administrator terminal 140 can display the availability status and also can display a list of one or more new clients to whom consultants should be allocated, the administrator may make a decision on the allocation and send the result of the decision to the allocated consultant's terminal 130 through the supporting server 100 as an allocation notification.

If there is no consultant who can be allocated, the supporting server 100 transmits a pre-consultation question to the client terminal 120 (S203). The pre-consultation question generates a conversation with the client by an automatically sent question, and reduces the possibility of the client leaving because there is no consultant who can immediately respond. It also elicits a response from the client regarding the contents of the consultation (S204) to streamline the allocation of a consultant. Unlike the telephone, SNS is asynchronous in nature, and thus can naturally initiate communication in a way that a consultant does not directly respond from the beginning.

The pre-consultation question is shown in FIG. 2 as only one round trip question and answer, but it can be a hierarchical plurality of questions by which a category that characterizes the consultation contents can be provided. For example, by making a question such as "What kind of things do you want to talk about?" and get answers such as "friends and school," "family and myself," "study and higher education," "just want to talk," and "something is bothering my mind." If the answer is "friends and school," a question such as "What kind of problems do you have with your friends and school?" can be made and get answers such as "bullying", "teachers", and "what happened at school." If the answer is "bullying," a question such as "What did you do about bullying?" can be made and get answers such as "I am being bullied," "My friend is being bullied," "I can't stop bullying my friend," "I am told to go bully them," and "There is no adult I can talk to about it."

Based on one or more answers to such a pre-consultation question, the supporting server 100 can provide a category such as "bullying" corresponding to the answers or a further subdivided category to the consultation contents (S205). Examples of the category are "suicide," "bullying," "personal distress," and "abuse." By branching in response to each answer to the hierarchical plurality of questions to the client, one of the categories can be provided. The correspondence between one or more answers to one or more questions and a category can be obtained using a learned model generated by machine learning instead of predetermined branching. The correspondence may be stored in the storage unit 103 or in a storage medium or storage apparatus accessible from the apparatus 100.

When the consultation of any of the consultants ends after the category provision, the supporting server 100 receives an end notification from the consultant terminal 130 of the consultant (S206). The supporting server 100 updates the availability status of each consultant in response to the end notification, and if the consultant can be allocated to the client (S207), the supporting server 100 transmits an allocation notification to the consultant terminal 130 (S208). If the consultant is allocated to a client, the consultant sends a message to the client (S209).

It is noted above that the decision on whether to allocate and the notification of allocation can be made by the administrator rather than the supporting server 100. Alternatively, a consultant who has completed the consultation at the time of or after the end notification may look at the list of one or more clients to whom consultants should be allocated displayed on the consultant terminal 130 and select the client to whom he or she will respond.

If the categories to which each consultant can respond are stored in the storage unit 103 or in a storage medium or storage apparatus accessible from the apparatus 100, providing a category to the consultation contents allows the allocation of a consultant who can respond appropriately to the consultation contents.

More generally, the above explanation assumes that a pre-consultation question is asked when there is no consultant who can be allocated to a new consultation, but even when there is a consultant who is not currently responding to a consultation, a pre-consultation question can be used to elicit responses from a client regarding the consultation contents to efficiently allocate a consultant who is capable of responding to the consultation appropriately.

Figure 3:
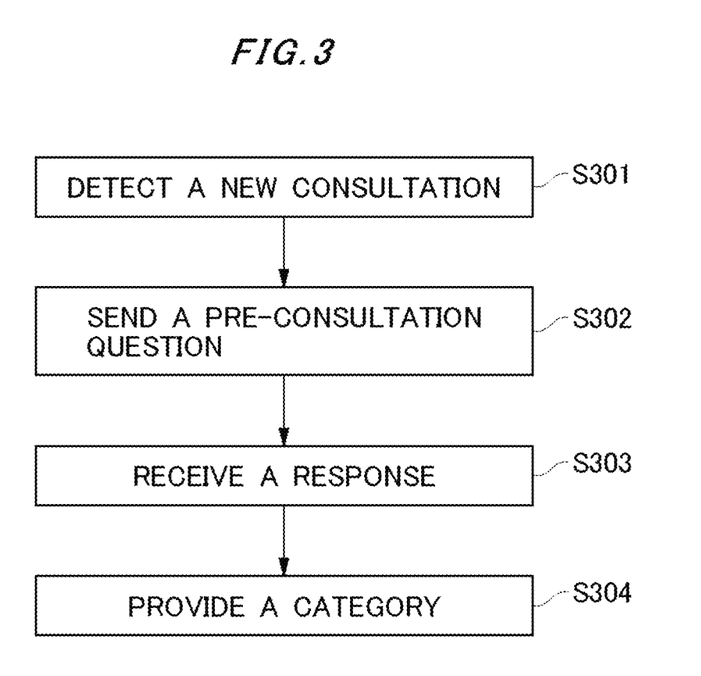
FIG. 3 shows the flow of category provision according to the first embodiment of the present invention.

If we focus on the processes at the supporting server 100, the flow until a category is provided is shown in FIG. 3.

It is to be noted that if the term "only" is not written, such as in "based only on x", "in response to x only", or "in case of x only", in the present specification, it is assumed that additional information may also be taken into account. Also, as an example, it is to be noted that a description "b is performed in case of a" does not necessarily mean "b is always performed in case of a" or "a is performed immediately after a" except where expressly stated.

In addition, as a caveat, even if there are characteristics of a method, a program, a terminal, an apparatus, a server or a system (hereinafter referred to as "method, etc.") that perform operations different from those described herein, each aspect of the invention is intended to perform the same operation as one of the operations described herein, and the existence of an operation different from those described herein does not mean that the method, etc. is outside the scope of each aspect of the invention.

Second Embodiment

An order of priority can be set to the plurality of categories that can be allocated to the consultation contents according to the first embodiment. The priority order can be stored in the storage unit 103 or in a storage medium or storage apparatus accessible from the apparatus 100. For example, in the case of children, "suicide" may be ranked first, "bullying" second, and "personal distress" and "abuse" third.

In this embodiment, when the supporting server 100 allocates a consultant, it gives priority to allocating a consultant to a client who seeks consultation in the category with the higher priority. More specifically, when a consultant capable of responding to consultations in multiple categories, including the category allocated to the consultation contents of one of the clients, the consultant is allocated to the client if the category allocated to the consultation contents of the client has a higher priority than the categories allocated to the consultation contents of other clients.

Figure 4:
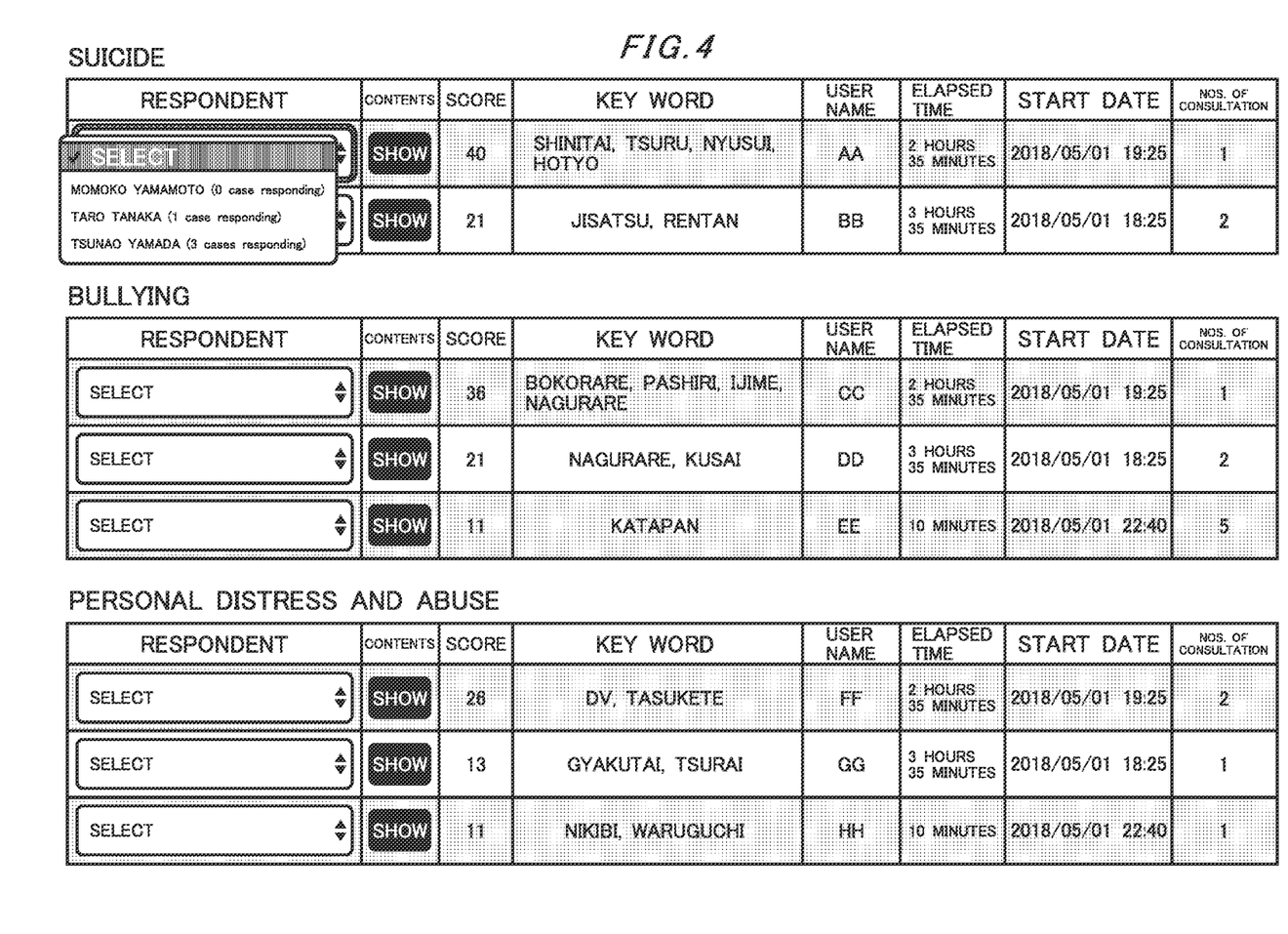
FIG. 4 shows an example of a list of clients displayed on an administrator terminal in the second embodiment of the present invention.

When the administrator, not the supporting server 100, makes the allocation, the list of one or more clients in the category with a higher priority can be emphasized on the administrator terminal 140 (see FIG. 4). When the consultant who has completed a consultation, not the supporting server 100, selects a client himself, the list of one or more clients in the category with a higher priority can be emphasized on the consultant terminal 130. As an example, the emphasized display can be a display of one or more clients in the category with a higher priority in an upper area.

Third Embodiment

If the number of clients with consultation contents belonging to a category provided according to the first or second embodiment exceeds the number of consultants that can be allocated to the consultation contents belonging to that category, one or more clients to whom consultants should be allocated will be in waiting status. In this embodiment, the importance of each consultation contents is scored to rank the clients in the waiting status for each category.

This makes it possible to allocate consultants to deeply troubled clients as early as possible.

The scoring, for example, can be based on the contents input at the client terminal 120 when there is still no consultant who can be allocated after the category provision. Specifically, scores for respective categories may be predetermined for a keyword, and the sum of the scores for one or more keywords included in the input contents or a value corresponding to the sum may be used as the score for the consultation contents. If the client makes an additional input, the score can be updated, and the score will rise from zero as more inputs are made. The answer to the pre-consultation question can be selective, but if it is descriptive, the contents written as the answer to the pre-consultation question can also be used for scoring.

When displaying one or more clients to be allocated to the administrator terminal 140 as shown in FIG. 4, clients with high scores can be emphasized, and the scores can be updated according to the inputs by each client. The emphasized display can be a display of a client with higher score in a upper area as an example. This is also the case when displaying the information on the consultant terminal 130.

When a consultant who can respond to a consultation in the category provided to any of the clients becomes available for allocation, the consultant can be allocated to that client if the score of that consultation contents is higher than the scores of other consultation contents to which the category is provided. If we look at the suicide category in the example of FIG. 4, the score of user AA is 40 and the score of user BB is 21. Therefore, when a consultant capable of responding to the suicide category consultation has completed the consultation and is ready to be allocated, the supporting server 100 can allocate the consultant to user AA. At this time, the supporting server 100 may transmit an allocation notification to the consultant terminal 130 of the consultant.

If the score reaches or exceeds a predetermined threshold, the supporting server 100 can transmit an emergency notification to the administrator terminal 140. The emergency notification informs that a client with a serious problem is in waiting status. In response to the emergency notification, it is preferred that the administrator allocates a consultant who is capable of responding to the consultation by terminating the consultation he or she is responding to or by replacing him or her with another consultant with respect to the consultation he or she is responding to. Alternatively, it is preferred to transmit an emergency notification to consultant terminals 130 of consultants who are capable of responding to the consultation, and urge the consultant to respond to the consultation.

After the pre-consultation question, it is desired to transmit a message such as "While you are waiting, feel free to write down what is bothering you so that the consultant can listen to you more carefully." from the supporting server 100 to the client terminal 120 to elicit a statement, i.e., an input with respect to the consultation contents.

When the input by the consultant is obtained, the supporting server 100 may perform an emotional analysis of the inputted contents to infer a psychological state, and transmit a message corresponding to the psychological state to the client terminal 120 to elicit further statements. As an example, when words such as "intend," "want," "can," etc. are included in the input contents, it can be inferred that the client is in a psychological state corresponding to each word.

Fourth Embodiment

Although it is preferable to have a sufficient number of consultants to meet the expected number of consultations, it is also beneficial to reduce the number of consultations that require actual consultation services by consultants in order to implement consultations over problems within a certain budget. For this purpose, in this embodiment, a psychological test is transmitted and provided before a pre-consultation question is transmitted from the supporting server 100 to the client terminal 120. In the process of taking the psychological test, it is conceivable that the person will sort out his or her feelings and resolve the problem himself or herself, thus shortening the list of clients in waiting status. More generally, in this embodiment, contents to help the client deepen his or her understanding of the consultation contents, not limited to psychological tests, are transmitted and provided. The contents may also be provided not before the transmission of a pre-consultation question, but after the transmission and before the allocation of a consultant.

REFERENCE SIGNS LIST

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

100 Supporting server
101 Communication unit
102 Processing unit
103 Storage unit
110 SNS server
120 Client terminal
130 Consultant terminal
140 Administrator terminal

The invention claimed is:

1. A method for supporting consultations using a social networking service (SNS), comprising:
    detecting, by at least one supporting server, that a new consultation has occurred or may occur based on communication with a client terminal via the SNS,
    transmitting, by the at least one supporting server, a set of pre-consultation questions to the client terminal after the detection via the SNS, the set of pre-consultation questions comprising a plurality of hierarchical questions,
    receiving, by the at least one supporting server, one or more answers to at least a portion of the set of pre-consultation questions from the client terminal via the SNS,
    providing, by the at least one supporting server, a category to consultation contents of the consultation, the category being determined based on the one or metre answers, and
    transmitting, by the at least one supporting server, a psychological test to the client terminal before transmitting the set of pre-consultation questions.

2. The method according to claim 1, further comprising allocating, by the at least one supporting server, a consultant, who can respond to consultations with the category provided to the consultation contents, to a client of the client terminal.

3. The method according to claim 1, wherein an order of priority is set to a plurality of categories that can be provided, by the at least one supporting server, to consultation contents.

4. The method according to claim 1, further comprising scoring, by the at least one supporting server, the consultation contents.

5. The method according to claim 4, wherein the seating is performed using a written answer to the set of pre-consultation questions.

6. The method according to claim 4, further comprising transmitting, by the at least one supporting server, a message prompting an input with respect to the consultation contents to the client terminal via the SNS after provision of the category,
wherein the scoring is performed using the input by the client.

7. The method according to claim 6, wherein the scoring includes updating a score when the client made an additional input.

8. The method according to claim 4, further comprising allocating, by the at least one supporting server, a consultant to a client of the client terminal, if a score of the consultation contents is higher than scores of other consultation contents to which the category is provided when a consultant who can address a consultation with the category provided to the consultation contents becomes available.

9. The method according to claim 4, further including transmitting, by the at least one supporting server, an emergency notification to a manager terminal if a score of the consultation contents reaches or exceeds a predetermined threshold.

10. At least one non-transitory computer-readable storage medium comprising program instructions for causing a computer to execute a method for supporting consultations using a social networking service (SNS), the program instructions, when executed by a computing system, causing the computing system to perform operations comprising:
detecting that a new consultation has occurred or may occur based on communication with a client terminal via the SNS,
transmitting a set of pre-consultation questions to the client terminal after the detection via the SNS, the set of pre-consultation questions comprising a plurality of hierarchical questions,
receiving one or more answers to the set of pre-consultation questions from the client terminal via the SNS,
providing a category to consultation contents of the consultation, the category being determined based on the one or more answers, and
transmitting a psychological test to the client terminal before transmitting the set of pre-consultation questions.

11. An apparatus for supporting consultations using a social networking service (SNS), the apparatus comprising one or more computers configured to:
detect that a new consultation has occurred or may occur based on communication with a client terminal via the SNS,
transmit a set of pre-consultation questions to the client terminal after the detection via the SNS, the set of pre-consultation questions being a plurality of hierarchical questions,
receive one or more answers to the set f pre-consultation questions from the client terminal via the SNS,
provide a category to consultation contents of the consultation, the category being determined based on one or more answers, and
transmit a psychological test to the client terminal before transmission of the set of pre-consultation questions.

12. The at least one non-transitory computer-readable storage medium according to claim 10, wherein in the operations, providing a category to consultation contents includes providing a plurality of categories; and
wherein the operations further include:
setting an order of priority of each of the plurality of categories.

13. The apparatus according to claim 11, wherein the one or more computers is configured to provide a plurality of categories to the consultation contents; and
set an order of priority of each of the plurality of categories.

14. The at least one non-transitory computer-readable storage medium according to claim 10, wherein the operations further include:
transmitting a message prompting an input with respect to the consultation contents to the client terminal via the SNS after provision of the category, and
scoring the consultation content, wherein the scoring is performed using the input by the client.

15. The at least one non-transitory computer-readable storage medium according to claim 10, wherein the operations further include:
scoring the consultation content, and
allocating a consultant to a client of the client terminal, if a score of the consultation contents is higher than scores of other consultation contents to which the category is provided when a consultant who can address a consultation with the category provided to the consultation contents becomes available.

16. The at least one non-transitory computer-readable storage medium according to claim 10, wherein the operations further include:
scoring the consultation content, and
transmitting an emergency notification to a manager terminal if a score of the consultation contents reaches or exceeds a predetermined threshold.

17. The apparatus according to claim 11, wherein the one or more computers is further configured to:
transmit a message prompting an input with respect to the consultation contents to the client terminal via the SNS after provision of the category, and
score the consultation content using the input by the client.

18. The apparatus according to claim 11, wherein the one or more computers is further configured to:
score the consultation content, and
allocate a consultant to a client of the client terminal, if a score of the consultation contents is higher than scores of other consultation contents to which the category is provided when a consultant who can address a consultation with the category provided to the consultation contents becomes available.

19. The apparatus according to claim 11, wherein the one or more computers is further configured to:
score the consultation content, and
transmit an emergency notification to a manager terminal if a score of the consultation contents reaches or exceeds a predetermined threshold.

\* \* \* \* \*